June 19, 1945.  T. W. VICKERS  2,378,669
ELECTRICAL MACHINE
Filed Nov. 8, 1943  3 Sheets-Sheet 1

INVENTOR.
THEODORE W. VICKERS
BY Frederick Diehl
ATTORNEY

June 19, 1945.  T. W. VICKERS  2,378,669
ELECTRICAL MACHINE
Filed Nov. 8, 1943  3 Sheets-Sheet 2
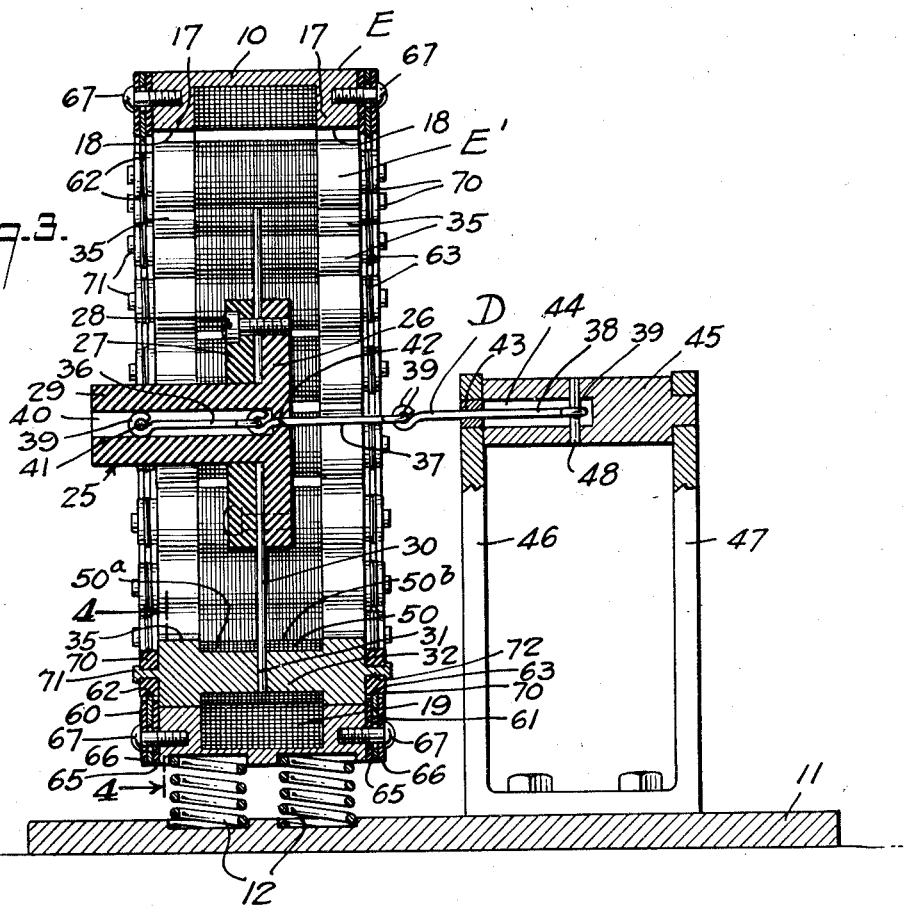
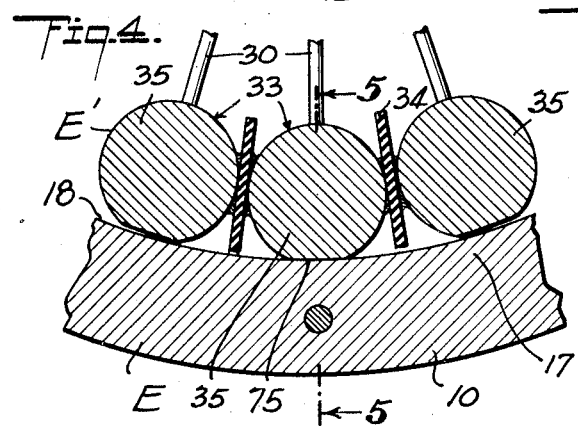
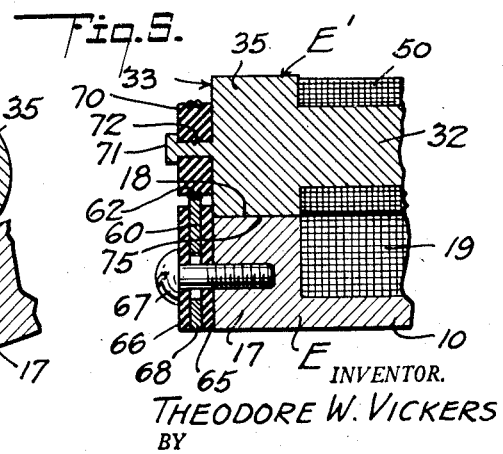
INVENTOR.
THEODORE W. VICKERS
BY
Frederick Diehl
ATTORNEY June 19, 1945. T. W. VICKERS 2,378,669
ELECTRICAL MACHINE
Filed Nov. 8, 1943 3 Sheets-Sheet 3

INVENTOR.
THEODORE W. VICKERS
BY
Frederick Diehl
ATTORNEY

Patented June 19, 1945

2,378,669

UNITED STATES PATENT OFFICE 2,378,669

ELECTRICAL MACHINE

Theodore W. Vickers, Los Angeles, Calif.

Application November 8, 1943, Serial No. 509,415

11 Claims. (Cl. 171—252)

This invention relates to electrical machines of the general character embodied in my copending applications Serial Nos. 488,161 and 498,937, filed on May 24, 1943, and August 17, 1943, respectively. These applications disclose and claim an electrical machine which embodies relatively movable and specifically rotatable magnetic fields operatively associated to derive mechanical force from the compression of a magnetic field by moving the point of application of the force in a path effecting continuous force displacement rotationally, which can be utilized to perform useful work. In one embodiment, the inventions utilize one or more air gaps created between two magnetic elements of a machine which are mounted to move relatively in a curvilinear path and are coactable in response to a force acting continuously across the air gap, to convert the acting force into the relative movement of the elements, all while maintaining the gap and causing it to progress in a manner to continue the relative movement between the elements.

The broad principle of obtaining continuous mechanical force along a predetermined path from a magnetic field, is inherent in the present invention which has many additional objects and advantages among which are the following:

1. To magnetically and electrically relate the two relatively movable elements so that only the densest portion of the magnetic field across the air gap which lies immediately in advance of a point of contact between the elements, is utilized as the field of magnetic attraction in one direction or the other of relative movement of the elements, while the remainder of the air gap is utilized as a field of repulsion, all to the end of obtaining maximum torque and minimum slippage or sliding action between the elements, and hence greatly increasing the efficiency of the machine.

2. To correlate the factor of time during which the field and rotor fluxes of the respective elements are changing their magnetic relationship from attraction and repulsion or vice versa, with a predetermined load and speed, so as to obtain maximum power output from the machine in proportion to its weight.

3. To employ such flux-retaining metals in the magnetic circuits of the elements that braking and locking effects between the elements may be obtained without the consumption of electric current for such functioning of the machine.

4. To render the rotatable element free for movement in any direction perpendicular to the axis of rotation and to flexibly mount the non- rotatable element for similar movement while yieldingly restraining same against its tendency to rotate, within the limit of a predetermined eccentric relationship between the elements, so as to neutralize the inertia of the rotatable element and thus prevent inertia-created vibration from being transmitted to the support or mounting of the machine.

With these and other objects in view, the invention resides in the combinations, arrangements and functional relationships of elements as set forth in the following specification and particularly pointed out in the appended claims.

In the accompanying drawings,

Figure 3 is a longitudinal axial sectional view taken on the line 3—3 of Figure 1;

Figure 4 is an enlarged fragmentary sectional view taken on the line 4—4 of Figure 3;

Figure 5 is an enlarged fragmentary sectional view taken on the line 5—5 of Figure 4;

Referring specifically to the drawings, the invention in its illustrated embodiment, operates by direct current, but it will be understood that the invention is also adapted for operation by alternating current. The invention comprises relatively movable and specifically rotatable electromagnetic elements E and E' which are eccentrically related, with the inner element E' rotatable and operatively connected to a driven member D to transmit rotary motion thereto. Either one or the other of the elements can be rotatable within the scope of this disclosure.

Figure 1:
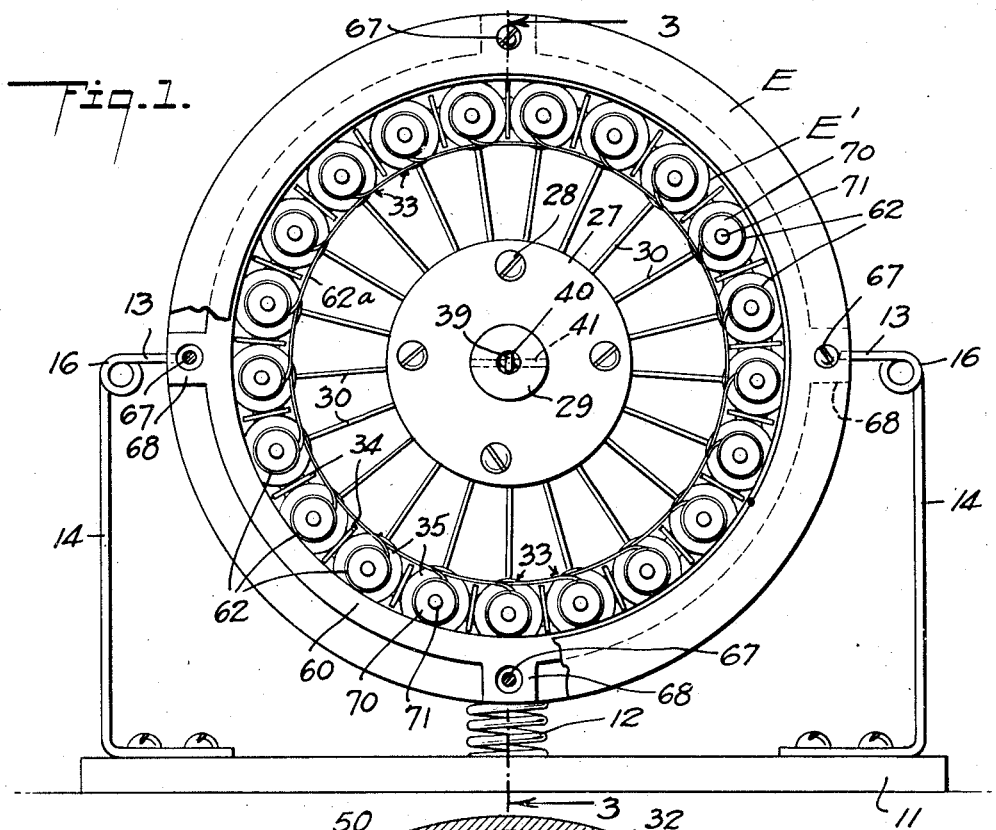
Figure 1 is a view showing, in end elevation partly broken away, one form of electrical machine embodying this invention.
Figure 2:
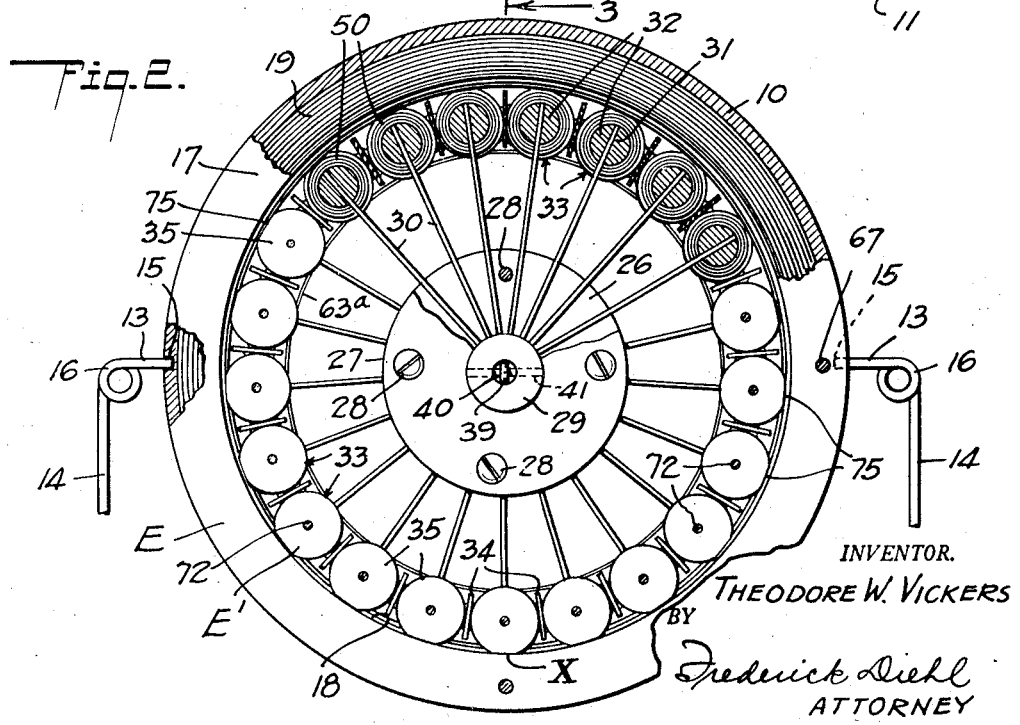
Figure 2 is a view similar to Figure 1, with the commutating mechanism omitted and portions of the electromagnetic elements in section.

The non-rotatable outer element E constitutes the stationary magnetic field of the machine and is in the form of an annular body 10 of flux-retaining metal, and is resiliently mounted on a base 11 by resting on a coil spring 12 and being engaged at diametrically and horizontally opposite points by arms 13 of generally L-shaped brackets of spring metal, designated at 14 and secured to the base 11 as shown in Figure 1. The free ends of the arms 13 seat in sockets 15 in the body 10, and are connected to the other portions of the brackets by spring coils 16 which yieldingly restrain the element E from rotating, and in a manner to confine such movement of the element within the limit of eccentricity between the elements E and E' for a purpose to be later described.

The body 10 is U-shaped in cross section to provide spaced annular webs 17 whose internal annular surfaces provide tracks or runways 18 with which the element E' is adapted to have rolling contact. In the space between the webs 17 is a winding 19 which is connected in series with a source of direct current supply such as a battery 20, under control of a switch 21 (Figure 6) so as to enable the stationary field to be energized or deenergized at will.

The element E' constitutes the rotor or armature of the machine, and comprises a hub 25 composed of two disks 26 and 27 of insulating material secured together by screws 28, with the disk 27 having a central opening through which an axial sleeve 29 on the disk 26 projects. Clamped between the disks 26 and 27 are radially arranged wire spokes 30 the outer ends of which are secured in diametric bores 31 through the cores 32 of a set of electromagnets 33 which in the present instance are twenty-one in number and are equally spaced circumferentially in close proximity to each other with strips 34 of insulating material between them. The cores 32 are provided with flanges 35 spaced apart to correspond with the spacing of the webs 17 and to engage or ride upon the tracks 18 of such webs. It will be noted that the flanges 35 of all electromagnets 33 co-act to provide a generally circular body whose outside diameter is less than the inside diameter of the element E defined by the tracks 18, with the difference between these two diameters being sufficient for the element E' to be eccentrically disposed within the element E in hypocyclic relation to the latter for rolling contact therewith as the element E' rotates.

The driven member D comprises a shaft composed of spring wire sections 36, 37 and 38 flexibly connected by interengaging eyes 39. The shaft section 36 is freely received in a central longitudinal bore 40 in the sleeve 29 of the hub 25 and is operatively connected thereto by a pin 41 passing diametrically through the eye 39 on the free end of the section 36.

The shaft section 37 is connected to the section 36 substantially at the plane of the spokes 30 and projects from the hub 25 through a closely related bore 42 for connection to the shaft section 38. The section 38 projects through a closely fitting portion 43 of a bore 44 in a power transferring member 45 which may be a pulley journaled in bearings 46 and 47 secured to the base 11. A pin 48 passing diametrically through the member 45 and through the eye 39 on the free end of the shaft section 38, operatively connects the latter to such member, all as clearly shown in Figure 3.

It will be clear that by this mounting of the element E', it will be free to move in any direction parallel to a plane perpendicular to its axis and to the axis of the element E, yet will be confined against axial displacement relative to the element E. Thus, the element E' is provided with a bearingless mounting reducing mechanical frictional losses to a negligible minimum. This feature of free mounting of the element E' combined with the resilient mounting and restraint of the element E against rotation, enables the elements to move towards each other during operation of the machine, so as to prevent transmission of vibration to the base 11, by neutralizing the inertia and momentum of the rotating element.

Figure 6:
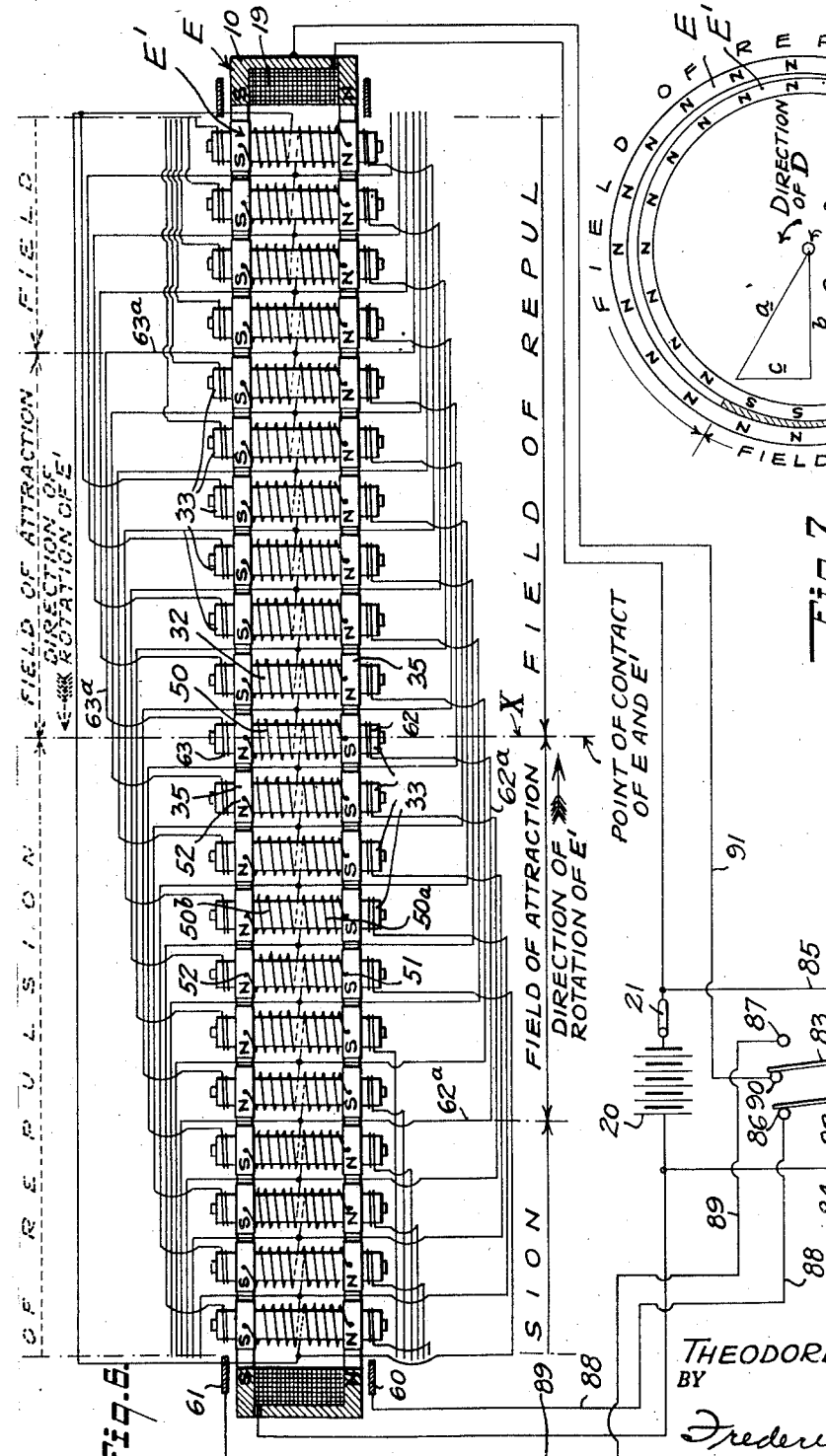
Figure 6 is a schematic view in the form of a flat development of the two co-acting cylindrically shaped electromagnetic elements, and illustrating the electrical and magnetic circuits of the machine.

Between the flanges 35 of the core 32 of each electromagnet 33, is an insulated winding 50 which is wound upon the core and is divided into two sections which may be termed right and left end sections 50a and 50b with respect to the length of the core 32 as shown in Figure 6. The opposite ends of such winding sections are electrically connected at 51 and 52 respectively, to the core 32 on which that particular winding 50 is wound. The other end of a right end winding section 50a of any one magnet is connected to the other end of the left end winding section 50b of the next magnet, which arrangement is followed throughout all winding sections, to the end that all the windings 50 will be connected in series through their cores, as will be clear from Figure 6.

For their operation by direct current, the elements E and E' are provided with a commutator mechanism including two commutator rings 60 and 61 on the element E, and two sets of contacts 62 and 63, there being one contact 62 and one contact 63 for each electromagnet 33, and coactable with the contact rings 60 and 61 respectively.

The contact rings 60 and 61 are clamped between insulating rings 65 and 66 by screws 67 which pass through the insulating rings and freely through large openings in ears 68 on the contact rings into the body 10, so as to rigidly secure the contact rings on opposite sides of the body and with the inner annular surfaces of the contact rings concentrically related to the tracks 18. The inner insulating rings 65 co-act with the outer faces of the core flanges 35 to confine the magnets 33 against displacement axially and to maintain them in alinement with the body 10.

The contacts 62 and 63 are parts of conductors 62a and 63a respectively, two convolutions of which are wrapped tightly around a support 70 of solid resilient rubber which has been forced past the head 71 of a shank 72 projecting from each end of each core 32 as shown in Figure 3. The two contacts 62 and 63 thus provided on opposite ends of each electromagnet 33, make electrical engagement with the respective contact rings only at or in close proximity to the point of rolling contact X between the flanges 35 and the tracks 18, indicated in Figures 1 and 3.

It will be noted that the portions of the peripheries of the flanges 35 which ride upon the tracks 18 consist of short arcs of a circle whose radius corresponds to that of the tracks 18. These flattened portions 75 of the flanges increase the contact areas between the magnets and the tracks 18 so as to increase the magnetic holding or braking effect, and decrease the electrical resistance therebetween during operation of the machine, as will be hereinafter described.

From a consideration of Figure 6, it will be seen that the conductor 62a of each contact 62 is electrically connected to the series-connected windings 50 of the electromagnets 33 at or about the location of that electromagnet which is 120 degrees displaced in one direction from the respective contact, which, in the present instance, is between the seventh and eighth electromagnets from that one having such contact. Also that the conductor 63a of each contact 63 is electrically connected to the windings 50 at or about the location of that magnet which is 120 degrees displaced in the opposite direction from the respective contact, which likewise, is between the seventh and eighth magnets from that one having such contact, all for a purpose to be later described.

For controlling operation of the electrical machine as above described, a reversing switch R is provided. This switch is composed of an insulated arm 80 pivoted at 81 and carrying spaced, flexible contact members 82 and 83 which are connected by conductors 84 and 85 to opposite sides of the battery 20. The switch R also includes two commutator contacts 86 and 87 connected by conductors 88 and 89 respectively, to the contact rings 60 and 61. A third contact 90 is connected by a common return conductor 91 to the body 10 and is adapted to be included in a circuit with either the contact 86 or 87 according as the machine is to be supplied with current to rotate the element E' in one direction or the other in the operation of the machine which is as follows:

With current supplied to the machine by closing the switch 21 and by closing the commutation circuit through contacts 86 and 90 of the switch R as shown in Figure 6, the attraction and repulsion will be created in the air gap between the elements E and E' in the proportion and relationship shown in this figure and Figure 7, and resulting from the flow of current in the magnetic circuit as follows:

From one side of the battery 20 through the winding 19 of the element E to the other side of the battery so as to produce a non-changing or stationary magnetic field. From one side of the battery 20 through conductor 84, contact member 82, contact 86, conductor 88, commutator ring 60, that one of the contacts 62 in contact with the ring 60 at the point of contact X, then through the respective conductor 62a, windings of the seven electromagnets 33 in advance of the point of contact X, flange 35 of that electromagnet 33 at the point of contact X, track 18, and finally through the body 10 of the element E, conductor 91, contact 90, contact member 83, conductor 85 to the other side of the battery 20.

By virtue of the connection of the conductor 62a of the aforesaid particular contact 62 which happens to be in electrical contact with the commutator ring 60, to the series-connected windings 50 of the electromagnets 33 at a location or angular distance in advance of the point of contact between the elements, which includes seven of the electromagnets in the present instance, the polarities of these seven electromagnets will be opposite or in unlike relationship to the polarities of the non-changing magnetic field created by the winding 19, so as to create a field of magnetic attraction across the corresponding portion of the air gap, whereas the remaining electromagnets will have their polarities in the same or like relationship to the polarities of the magnetic field of the winding 19, thus creating a field of magnetic repulsion across the remaining major portion of the air gap.

Therefore, as the connections between the commutator contacts 62 and the windings 50 of the electromagnets 33 are displaced an angular distance of about 120 degrees in advance of the point of contact of the elements E and E', only the portion of the air gap across which the most powerful magnetic force can be attained, is utilized for the field of attraction.

Figure 7:
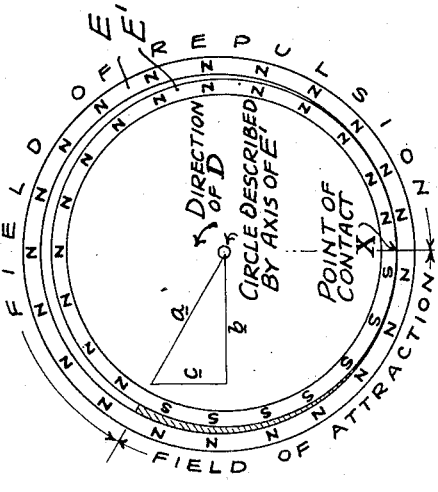
Figure 7 is a diagrammatic view of the two electromagnetic elements, in which the polarities of the magnetic circuits to create the fields of attraction and repulsion are illustrated.

In this connection, reference will be had specifically to Figure 7 in which $a$ represents the force of magnetic attraction; $b$ the force causing torque and resulting in rotation of the element E'; and $c$ the force moving or tending to move the element E' away from the element E at the point of contact X therebetween. It will be evident that the component representing the releasing force $c$ increases in magnitude as the angular distance increases from the point of contact between the elements, and that the force $b$ decreases.

As the force $c$ is detrimental to the positive rotational movement of the element E' by reducing its rolling pressure or frictional engagement against the element E, with a consequent increasing tendency of the element E' to slip or slide rather than roll within the element E, it will be clear that only a relatively small portion of the air gap which is immediately in advance rotationally, of the point of mechanical engagement of the elements, should be included in the field of attraction for maximum torque efficiency. The remaining widening portion of the air gap being capable of producing only a very weak torque, with an attending disproportionately large releasing or lifting force $c$ acting upon the element E' at its point of contact with the element E to permit slippage in the absence of a positive mechanical connection operatively connecting the elements.

By reversing the position of the switch R to engage the contact member 83 with the contact 87 so as to utilize the conductor 89 to supply current to the commutator ring 61, the direction of current flow in the magnetic circuit of the element E' will be reversed, thus reversing the polarities of the electromagnets 33. Therefore, the fields of attraction and repulsion will be reversed accordingly, with respect to the point of contact X between the elements E and E' so as to develop the torque upon the latter effecting its rotation indicated by the arrow accompanying the labeling of the field or attraction in broken lines in Figure 6, in the direction opposite to that in which it previously rotated, and as indicated by the arrow accompanying the labeling of the field of attraction in full lines in this figure.

From the foregoing description, it will be manifest that in the design of the machine, its electrical circuits are so arranged that the forces of attraction and repulsion are divided or proportioned throughout a cycle or revolution of the element E' to obtain maximum torque and minimum tendency for slippage of the element E' at its point of frictional contact with the element E against which latter the element E' is held by the magnetic force of attraction at and in close proximity to such point of contact. The magnitudes of these forces must be course be kept within predetermined limits depending upon the velocity of the element E', the torque required, the area of the point of contact between the elements E and E', and variations in the strength of the magnetic field across the air gap.

Furthermore, another factor affecting the efficiency of the machine is the time element involved in the reversal of a magnetic field. As time is required for the current to reverse and build up in the opposite direction, it is necessary that such time element be taken into consideration in order to prevent a drag upon the element E' by the force of attraction extending into that portion of the air gap immediately rearward or on the rear side of the point of contact between the elements.

By constructing the metal parts in the magnetic circuits of flux retaining metal, a condition similar to the action of a permanent magnet is attained. Thus, when no current is being supplied to the machine, the non-changing field of the element E will be unopposed by the fields in the element E' and thus will attract the latter at the point of contact X between the elements so as to have a powerful braking or holding effect upon the element E' to lock it against rotation. Actually, the effect of supplying current to the machine is to temporarily release this holding or braking force and permit the co-acting fields of the elements to create the attracting and repulsing forces across the air gap in a manner to develop maximum torque upon the rotatable element E' as previously described.

I claim:

1. An electrical machine of the class described comprising: two electromagnetic elements; means mounting said elements in hypocyclic relationship and in rolling engagement for relative rotation, to define a point of contact between the elements and an air gap therebetween increasing in width from said point of contact; means for energizing one of said elements to create a non-changing magnetic field; the other of said elements having a circular set of series-connected electromagnets operating in said magnetic field; and means co-acting with said magnets to energize same in such relationship of polarities to those of said magnetic field, that forces of attraction and repulsion will be created across said air gap for such angular distances from said point of contact that the algebraic sum of the resolved forces of attraction and repulsion tending to disengage the elements at said point of contact, will be negligible.

2. An electrical machine of the class described comprising: two electromagnetic elements; means mounting said elements in hypocyclic relationship and in rolling engagement for relative rotation, to define a point of contact between the elements and an air gap therebetween increasing in width from said point of contact; means for energizing one of said elements to create a non-changing magnetic field; the other of said elements having a circular set of series-connected electromagnets operating in said magnetic field; and means co-acting with said magnets to energize same in such relationship of polarities to those of said magnetic field, that a force of attraction across said air gap will be created only for an angular distance not exceeding approximately 120 degrees from said point of contact while a force of repulsion is created across the remainder of said air gap in order that the algebraic sum of the resolved forces of attraction and repulsion tending to relatively move the elements away from each other at said point of contact, will be at a minimum.

3. An electrical machine of the class described comprising: two electromagnetic elements; means mounting said elements in hypocyclic relationship and in rolling engagement for relative rotation, to define a point of contact between the elements and an air gap therebetween increasing in width from said point of contact; means for energizing one of said elements to create a non-changing magnetic field; the other of said elements having a circular set of series-connected electromagnets operating in said magnetic field; a continuous contact member concentrically related to one of said elements; contacts, one for each of said electromagnets, carried by said other element and adapted to successively engage said contact member as relative rotation between the elements is effected; and means electrically connecting said contacts to the windings of said electromagnets in a successive order and such angular displacement relative to the respective contacts, that current supplied to said contact member will energize the magnets to create forces of attraction and repulsion across said air gap for such angular distances from said point of contact that the algebraic sum of the resolved forces of attraction and repulsion tending to separate the elements at said point of contact, will be negligible.

4. An electrical machine of the class described comprising: two electromagnetic elements; means mounting said elements in hypocyclic relationship and in rolling engagement for relative rotation, to define a point of contact between the elements and an air gap therebetween increasing in width from said point of contact; means for energizing one of said elements to create a non-changing magnetic field; the other of said elements having a circular set of series-connected electromagnets operating in said magnetic field; a continuous contact member concentrically related to one of said elements; contacts, one for each of said electromagnets, carried by said other element and adapted to successively engage said contact member as relative rotation between the elements is effected; and means electrically connecting said contacts to the windings of said electromagnets in a successive order and such angular displacement relative to the respective contacts, that current supplied to said contact member will energize the magnets to create a force of attraction across said air gap only for such angular distance rotationally in advance of said point of contact that such force as is resolved from the force of attraction and tends to separate the elements at said point of contact, will be negligible, said last means energizing the magnets to create a force of repulsion across the air gap throughout the remainder of its angular distance.

5. An electrical machine of the class described comprising: two electromagnetic elements; means mounting said elements in hypocyclic relationship and in rolling engagement for relative rotation, to define a point of contact between the elements and an air gap therebetween increasing in width from said point of contact; means for energizing one of said elements to create a non-changing magnetic field; the other of said elements having a circular set of series-connected electromagnets operating in said magnetic field; and means co-acting with said elements to energize same in such relationship of polarities to those of said magnetic field, that forces of attraction and repulsion will be created across predetermined portions of said air gap to effect movement of the rotatable element; said one of the elements being constructed of flux-retaining metal operable when the supply of current to the machine is discontinued, to magnetically brake and hold the elements against relative rotation.

6. An electrical machine of the class described comprising: two electromagnetic elements; means mounting said elements in hypocyclic relationship and in rolling engagement for relative rotation, to define a point of contact between the elements and an air gap therebetween increasing in width from said point of contact; means for energizing one of said elements to create a non-changing magnetic field; the other of said elements having a series-connected electromagnets operating in said magnetic field; means co-acting with said magnets to energize same in such relationship of polarities to those of said magnetic field, that forces of attraction and repulsion will be created across said air gap for such angular distances from said point of contact that the algebraic sum of the resolved forces of attraction and repulsion tending to disengage the elements at said point of contact, will be negligible, and means co-acting with the last means to enable said forces of attraction and repulsion to be selectively created across the air gap for angular distances as aforestated, in one direction or the other from said point of contact, to move the rotatable element in one direction or the other.

7. An electrical machine of the class described comprising: two electromagnetic elements; means mounting said elements in hypocyclic relationship and in rolling engagement for relative rotation, to define a point of contact between the elements and an air gap therebetween increasing in width from said point of contact; means for energizing one of said elements to create a non-changing magnetic field; the other of said elements having a circular set of series-connected electromagnets operating in said magnetic field; and means co-acting with said magnets to energize same in such relationship of polarities to those of said magnetic field, that forces of attraction and repulsion will be created across said air gap for such angular distances from said point of contact that the algebraic sum of the resolved forces of attraction and repulsion tending to disengage the elements at said point of contact, will be negligible, said last means being responsive to relative rotational movement of said elements, to progressively advance the aforestated fields of attraction and repulsion at the speed of rotation of the rotatable element so as to continuously develop the torque on the rotatable element to continue its rotation.

8. An electrical machine of the class described comprising: two electromagnetic elements arranged one within the other in hypocyclic relationship for relative rotation, with the elements in rolling contact and the space between them constituting an air gap; means for energizing said elements to cause a field of attraction to be created across said air gap developing torque upon the rotatable element and to be progressively advanced rotationally as rotation of said element is effected by the torque; a support; and means mounting non-rotatable one of said elements on the support for a predetermined freedom of movement in all directions perpendicular to the axis of rotation so as to tend to prevent vibration from the eccentric motion of the rotatable element, being transmitted to the support.

9. An electrical machine of the class described comprising: two electromagnetic elements arranged one within the other in hypocyclic relationship for relative rotation, with the elements in rolling contact and the space between them constituting an air gap; means for energizing said elements to cause a field of attraction to be created across said air gap developing torque upon the rotatable element and to be progressively advanced rotationally as rotation of said element is effected by the torque; a support; means mounting one of said elements on the support for a predetermined freedom of movement in all directions perpendicular to the axis of rotation; a driven member; and means operatively connecting the other of said elements to the driven member while rendering said other of the elements free to move in any direction perpendicular to the axis of rotation for co-action with the mounting of said one of the elements in neutralizing vibrational forces so as to prevent the transmission of vibration to the support.

10. An electrical machine of the class described comprising: two electromagnetic elements arranged one within the other in hypocyclic relationship for relative rotation, with the elements in rolling contact and the space between them constituting an air gap; the inner one of said elements being free to move in any direction perpendicular to the axis of rotation; means for energizing said elements to cause a field of attraction to be created across such portion of the air gap as will develop torque effecting relative rotation of the elements; and means mounting the outer one of said elements for a predetermined freedom of movement in all directions perpendicular to the axis of rotation, for co-action with the aforestated freedom of movement of the inner element in neutralizing opposing vibrational forces created by relative rotation of the elements from the magnetically developed torque.

11. An electrical machine of the class described comprising: two electromagnetic elements; means mounting said elements in hypocyclic relationship and in rolling engagement for relative rotation, to define a point of contact between the elements and an air gap therebetween increasing in width from said point of contact; means for energizing one of said elements to create a non-changing magnetic field; the other of said elements having a circular set of series-connected electromagnets operating in said magnetic field; and means for supplying current to said electromagnets to create a rotating field in which a predetermined number of the magnets will be maintained at one polarity while the remaining magnets will be maintained at the opposite polarity, so that forces of attraction and repulsion will be created across predetermined portions of the air gap, to move the rotatable element.

THEODORE W. VICKERS.